April 8, 1952
H. G. McCLEAN
2,591,848
POWER GENERATING LOCOMOTIVE
Filed May 3, 1947
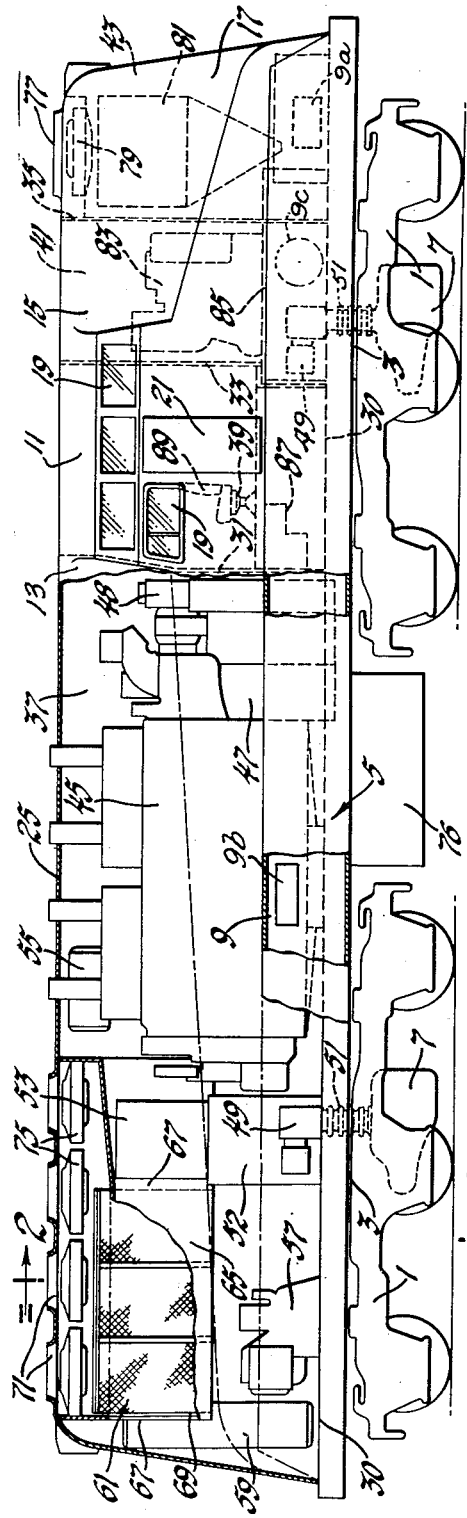
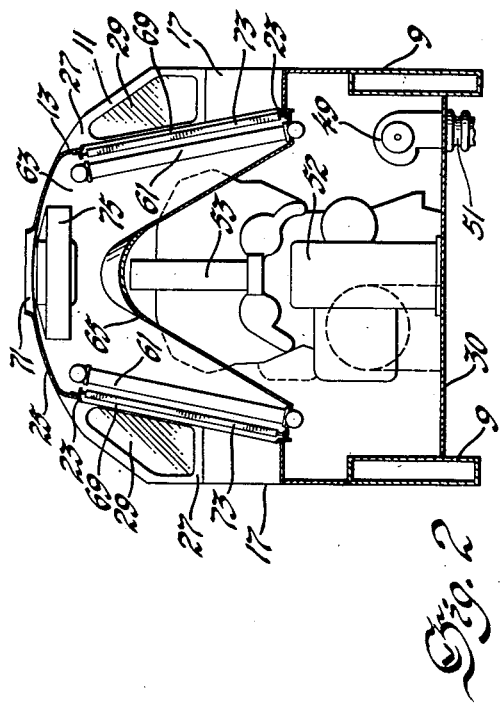
Inventor
Herbert G. McClean
By
Spencer, Willits, Helwig & Baillio
Attorneys Patented Apr. 8, 1952

2,591,848

UNITED STATES PATENT OFFICE 2,591,848

POWER GENERATING LOCOMOTIVE

Herbert George McClean, La Grange, Ill., assignor to General Motors Corporation, Detroit, Mich., a corporation of Delaware Application May 3, 1947, Serial No. 745,814

4 Claims. (Cl. 105—35)

This invention relates, generally, to locomotives of the generating electric type, and particularly relates to a compact disposition of the generating electric traction mechanism and auxiliary means therefor in a cab pivoted on traction trucks.

The object of the invention is to provide a disposition of high output generating electric traction mechanism and auxiliary means for providing an ample supply of conditioned air for the prime mover and for cooling the electrical traction equipment and certain auxiliaries and also a compact prime mover cooling means and control means in a locomotive cab of limited width and height and pivotally supported on multiple axle traction trucks to provide low axle loading and maximum tractive effort for high speed main and branch line service on railways using light ballast and rails and having restricted bridge and tunnel clearances.

The combination by which this object is accomplished will become apparent by reference to the following detailed description and drawings illustrating a locomotive structure for such service.

Figure 1 of the drawings is a vertical elevational view with parts broken away and in section of the locomotive in order to clearly show the novel structural details and arrangement.

Figure 2 is a transverse sectional view taken substantially on line 2—2 of Figure 1.

As best shown in Figure 1 of the drawings, the locomotive comprises a pair of three axle traction trucks 1 having center plates 3 for pivotally supporting a cab, generally indicated by the character reference 5. A separate electric traction motor is preferably provided for driving each truck axle and is operatively connected thereto in conventional manner. One traction motor, generally indicated by the character reference 7, is shown in each truck. The cab 5 is provided with hollow side support sills 9 which also serve as air ducts. The cab 5 generally comprises a control cab section 11 located between long and short hood sections 13—15 at the ends. The cab control section 11 is provided with side walls 17 flush with the outer surfaces of the side sills 9 and provided with side windows 19 and a door 21. The end hood sections 13—15 also have lower side walls flush with the side sills and narrow upper portions formed by inwardly inclined sides 23 and a roof 25 of arcuate form and joined flush with the similarly formed central roof portion of the control section 11, as best seen in Figure 2. The control section 11 is provided with end walls 27 at the corners joined to the walls of the narrower portions of the hood sections. End windows 29 are provided in the end walls 27 to provide a clear view of the track in both directions.

The cab 5 is provided with a main floor 30 and three transverse partitions 31, 33 and 35 having doors, not shown, located at the sides thereof to separate the cab into four compartments 37, 39, 41 and 43 and to provide access therebetween. The compartment 37 in the longer hood section 13 of the cab serves as the power compartment and includes an internal combustion engine 45 directly connected to an electric traction generator 47 for supplying power to the traction motors 7, an electrically driven blower 48 for cooling the generator 47 and an electrically operated traction motor blower 49 supplying air through a flexible hose connection 51 extending through an opening in the floor 30 to one traction motor 7. The engine is provided with an oil filter 52, oil cooler 53, engine coolant tanks, one of which is indicated by the character reference 55, and an electrically driven air brake compressor 57 or exhauster is also located in the power compartment 37 for charging a reservoir 59 for either the air pressure or vacuum operated brakes of the locomotive.

Engine cooling radiators 61 are mounted in an inverted U-shaped radiator air cooling duct 63, shown in Figure 2, formed by the outer walls 23 and roof 25 of the end portion of the longer hood section 13 and an inner inverted U-shaped partition 65 and connected by transverse end walls 67 to the walls and top of this hood portion. The duct 63 has inlet cooling air openings 69 in the opposite side walls 23 of the hood and air outlet openings 71 in the roof 25 of the hood. Shutters 73 are pivotally mounted in the inlet openings and electrically driven exhaust fans 75 are mounted in the air outlet openings 71 in the roof portion of the hood. An engine fuel tank 76 is shown mounted between trucks on the cab side sills 9.

The compartment 43 formed by the partition 35 in the outer end of the shorter hood section 15 serves as an air conditioning compartment. An air inlet opening 77 is provided in the roof of this compartment and an electrically driven fan 79 is provided therein for forcing air downwardly through a filter 81 and into openings 9a in the hollow side sills 9 of the cab. These side sills or air ducts 9 are provided with suitable air outlets 9b opening into the power compartment 37 to supply filtered induction air for the engine 45, and filtered cooling air for the generator and traction motor blowers 48—49 and all other auxiliary apparatus requiring filtered air, such as the brake compressor or exhauster 57. Additional outlets 9c in the side sills or air ducts 9 open into the cab compartment 41. Another traction motor blower 49, in the compartment 41, supplies filtered air through another flexible hose connection 51 extending through an opening in the floor 30 to a traction motor 7 on the other traction truck 1 under the shorter hood section 15 of the cab 5. The control compartment 39 in the control section 11 and the compartment 41 serving as a train heating compartment and including an automatic heating boiler 83 are provided with an elevated floor 85 with steps 87 leading downwardly to the main floor 30 of the cab 5. The space between the floors 85 and 30 contain the main boiler water tanks, storage batteries and electropneumatic control apparatus, not shown, for the engine and electric traction mechanisms. The control compartment 39 is provided with an operator's chair 89 and the manually operable power and braking control mechanisms, not shown.

The above described locomotive cab and truck arrangement enables high output traction and control apparatus and the auxiliaries therefor to be located in a cab of smaller dimensions, pivotally supported on multi-axle trucks to reduce weight per axle and enable high tractive force to be obtained from the locomotive.

I claim:

1. A locomotive comprising multi-axle traction trucks, electric traction motors for driving the axles and a cab supported on said trucks, said cab having partitions forming an elevated intermediate control compartment, a power compartment at one end, and an air conditioning compartment at the opposite end and a stressed longitudinally extending hollow cab member having openings for establishing communication between said end compartments, said air conditioning compartment having an overhead air inlet opening in the roof, and including a filter and power operated fan means communicating with the air inlet openings for supplying filtered air to said hollow cab member and said power compartment, said power compartment including an internal combustion engine and an electric traction generator driven thereby, said engine receiving filtered air from said power compartment, and power operated ventilating means in said compartments communicating with said power compartment and with said hollow body member for furnishing filtered cooling air to said traction generator and motors.

2. A locomotive comprising multi-axle traction trucks including electric traction motors on said trucks for driving the axles thereof and a cab pivotally supported on said trucks and having partitions therein forming an intermediate control compartment, a power compartment at one end and an air conditioning compartment at the other end, and hollow side cab supporting sills having openings for establishing communication between said power and said air conditioning compartments, said air conditioning compartment having an overhead air inlet opening in the roof and including a filter and an electrically driven fan for circulating air through said filter and said hollow side sills into said power compartment, said power compartment including an internal combustion engine receiving filtered air from said power compartment, an electric generator driven thereby, electrically operated air supplying ventilating means in said compartments communicating with said hollow cab side sills and said power compartment for supplying filtered air therefrom for cooling said generator and said traction motors.

3. A locomotive comprising multi-axle traction trucks including traction motors for driving said axles, a cab pivotally mounted on said trucks and having a central control section, end sections having upper portions of reduced width, partitions forming a power compartment in one end section, a central elevated control compartment, and a train heating compartment and an air conditioning compartment in the other end section, and hollow cab side supporting sills establishing communication between said air conditioning compartment and said power compartment, said power compartment including an internal combustion engine, a power generator and motor driven air pressure supplying means supplied with air from the interior of said power compartment and said hollow body side sills, certain of said pressure supplying means furnishing air for cooling said generator and said traction motors, said air conditioning compartment having an upper air inlet opening in the roof and including filtering means and motor driven air circulating means for supplying air to said engine and said hollow body side supporting sills and said motor driven pressure supplying means through said filtering means.

4. A locomotive having multi-axle traction trucks including electric traction motors for driving the truck axles, a cab pivotally supported on the trucks and having hollow lower side supporting sills, a main floor secured between the side sills adjacent the lower extremities thereof, a narrow hood section at each end of the cab, a full width control section between the hood sections and having an elevated floor, side windows and doors, and end windows facing in opposite directions alongside the narrow hood sections and cab partitions separating the control section from the hood sections and forming a power compartment in one end hood section and air conditioning and train heating compartments in the other end hood section, said air conditioning compartment having an air inlet opening in the upper part of the hood section thereof, air filtering means and air circulating means for forcing air through said filtering means from the air inlet opening into the interior of said air conditioning compartment, an internal combustion engine, an electric traction generator driven by the engine and pneumatic brake apparatus mounted on the main floor of the cab in the power compartment, said hollow lower side sills of said cab body having openings above the main floor level in said air conditioning and power compartments to supply filtered air to said engine and pneumatic brake apparatus, and generator and traction motor blowers for forcing filtered air from said power compartment and from the interior of said hollow side sill member through said generator and said traction motors for cooling said generator and said motors.

HERBERT GEORGE McCLEAN.

REFERENCES CITED

The following references are of record in the file of this patent:

UNITED STATES PATENTS

| Number | Name | Date |
| --- | --- | --- |
| 880,477 | Brinckerhoff | Feb. 25, 1908 |
| 1,915,149 | Blackhall et al. | June 20, 1933 |
| 1,997,299 | Herr | Apr. 9, 1935 |
| 2,190,144 | Blomberg et al. | Feb. 13, 1940 |
| 2,194,929 | Eckert | Mar. 26, 1940 |
| 2,230,580 | Adams et al. | Feb. 4, 1941 |
| 2,317,849 | Essl | Apr. 27, 1943 |

FOREIGN PATENTS

| Number | Country | Date |
| --- | --- | --- |
| 474,764 | Great Britain | Nov. 8, 1937 |